(12) United States Patent
Choi

(10) Patent No.: US 10,434,997 B2
(45) Date of Patent: Oct. 8, 2019

(54) VEHICLE CONTROL APPARATUS AND CONTROL METHOD THEREOF

(71) Applicant: MANDO CORPORATION, Pyeongtaek-si, Gyeonggi-do (KR)

(72) Inventor: Jun-Yeol Choi, Daegu (KR)

(73) Assignee: MANDO CORPORATION, Pyeongtaek-si (KR)

( * ) Notice: Subject to any disclaimer, the term of this patent is extended or adjusted under 35 U.S.C. 154(b) by 118 days.

(21) Appl. No.: 15/796,369

(22) Filed: Oct. 27, 2017

(65) Prior Publication Data
US 2018/0118178 A1 May 3, 2018

(30) Foreign Application Priority Data

Nov. 1, 2016 (KR) .................. 10-2016-0144670

(51) Int. Cl.
| | | |
|---|---|---|
| G06F 7/70 | (2006.01) | |
| G06F 19/00 | (2018.01) | |
| G06G 7/00 | (2006.01) | |
| G06G 7/76 | (2006.01) | |
| B60T 8/24 | (2006.01) | |
| B60T 8/58 | (2006.01) | |
| B60T 7/08 | (2006.01) | |
| B60T 7/10 | (2006.01) | |
| B60T 8/17 | (2006.01) | |
| B60T 8/172 | (2006.01) | |

(52) U.S. Cl.
CPC ............. *B60T 8/245* (2013.01); *B60T 7/085* (2013.01); *B60T 7/10* (2013.01); *B60T 8/17* (2013.01); *B60T 8/172* (2013.01); *B60T 8/58* (2013.01); *B60T 2201/06* (2013.01)

(58) Field of Classification Search
CPC . B60T 8/245; B60T 7/085; B60T 7/10; B60T 8/17; B60T 8/172; B60T 8/58; B60T 2201/06; B60T 7/12; B60T 8/17555; B60W 30/18109; B60W 10/184; B60W 10/182; F16H 63/486
USPC .......................................................... 701/70
See application file for complete search history.

(56) References Cited

U.S. PATENT DOCUMENTS

2018/0043895 A1* 2/2018 Shami ...................... B60T 7/12

* cited by examiner

*Primary Examiner* — Mahmoud S Ismail
(74) *Attorney, Agent, or Firm* — Morgan, Lewis & Bockius LLP

(57) ABSTRACT

A vehicle control apparatus includes an input portion configured to receive an engagement operation signal; a determiner configured to determine whether the engagement operation signal is generated before a vehicle is stopped and whether a current state is a first state; when the current state is the first state, determine whether the current state is a second state in which the vehicle is intended to be stopped on flat land; and, when the current state is the second state, determine that the current state is a third state in which it is impossible for the EPB apparatus to determine an inclination; and a controller configured to turn off an inclination determining mode and turn on an inclination determination impossible mode of the EPB apparatus when the current state is determined as the first state, the second state, and the third state.

10 Claims, 14 Drawing Sheets

VEHICLE CONTROL APPARATUS AND CONTROL METHOD THEREOF

This application claims the benefit of Korean Patent Application No. 2016-0144670, filed on Nov. 1, 2016 in the Korean Intellectual Property Office, the disclosure of which is incorporated herein by reference.

BACKGROUND

1. Field

Embodiments of the present disclosure relate to a vehicle control apparatus and a control method thereof.

2. Description of the Related Art

Generally, a conventional electronic parking brake (EPB) apparatus is a driver-friendly automatic brake apparatus which automatically operates a brake when an ignition is turned off and automatically releases the brake when the ignition is turned on and an accelerator is stepped on, thereby improving convenience of parking.

For example, Korean Registered Patent No. 10-1303757 (Aug. 29, 2013) discloses an apparatus for maintaining a braking force of a stopped vehicle and a method therefor which are capable of automatically maintaining the braking force when the vehicle is stopped using an EPB apparatus.

However, a conventional EPB apparatus generates a braking force according to an inclination, that is, generates a low braking force on land that is flat, an intermediate braking force on land that is less inclined, and a high braking force on land that is highly inclined, and, when an inclination determination is impossible, the conventional EPB apparatus generates a maximum braking force.

As one example, in the conventional EPB apparatus, when an engagement operation signal for EPB engagement is generated at a time immediately before a vehicle is stopped, an input value of an acceleration sensor, which is a sensing apparatus for sensing an acceleration value, is fluctuated so that there is a limitation on an inclination determination even though the acceleration sensor operates normally.

When a braking force is released, the conventional EPB apparatus has a limitation in shortening a time at which a braking force is released such that there is a limitation on improvement of traveling efficiency when a stopping mode is switched to a traveling mode.

Recently, therefore, research is ongoing on an improved vehicle control apparatus and an improved control method thereof for improving traveling efficiency when the stopping mode is switched to the traveling mode by shortening a time at which a braking force of an EPB apparatus is released when the braking force is released.

PRIOR ART DOCUMENT

Patent Document

Korean Registered Patent No. 10-1303757 (Aug. 29, 2013)

SUMMARY

Therefore, it is one aspect of the present disclosure to provide a vehicle control apparatus and a control method thereof which are capable of improving traveling efficiency when a stopping mode is switched to a traveling mode.

It is another aspect of the present disclosure to provide a vehicle control apparatus and a control method thereof which are capable of inducing a driver to drive cautiously while suppressing anxiety of the driver about a current electronic parking brake (EPB) engagement operating state, a current inclination determination state thereof, and a current braking force state thereof.

Additional aspects of the disclosure will be set forth in part in the description which follows and, in part, will be obvious from the description, or may be learned by practice of the disclosure.

In accordance with one aspect of the present disclosure, a vehicle control apparatus including an input portion configured to receive an engagement operation signal for stopping from an EPB apparatus and a current wheel speed value and a current acceleration value sensed by a sensing apparatus; a determiner configured to determine whether the engagement operation signal is generated at a time immediately before a vehicle is stopped, and thus whether a current state is a first state on the basis of the current wheel speed value; when the current state is determined as the first state, determine whether the current state is a second state in which the vehicle is intended to be stopped on land that is flat on the basis of the current acceleration value; and, when the current state is determined as the second state, determine that the current state is a third state in which it is impossible for the EPB apparatus to determine an inclination; and a controller configured to turn off an inclination determining mode of the EPB apparatus and turn on an inclination determination impossible mode of the EPB apparatus when the current state is determined as the first state, the second state, and the third state, thereby controlling the EPB apparatus to lower a current braking force value of the EPB apparatus to a target braking force value which is set to correspond to the inclination determination impossible mode.

When the determiner determines whether the current state is the first state, the determiner may determine whether the current wheel speed value is generated at a time at which the current wheel speed value reaches a target wheel speed value which is set correspond to a time immediately before the vehicle is stopped, and whether the engagement operation signal is generated at a time at which the engagement operation signal reaches the target wheel speed value.

When the determiner determines whether the current state is the second state, the determiner may determine that the vehicle is intended to be stopped on the flat land when a magnitude of a sampled signal of the current acceleration value is smaller than a magnitude level of a sampled signal of the target acceleration value which is set to correspond to a time immediately before the vehicle is stopped.

When the controller receives a braking force adjustment completion signal corresponding to the current lowered braking force value from the EPB apparatus, the controller may further control the EPB apparatus to perform a braking force release operation thereof at a set target release time.

The controller may apply a braking force releasing operation signal to the EPB apparatus in advance prior to the set target release time to allow the braking force release operation of the EPB apparatus to be performed at the set target release time.

In accordance with another aspect of the present disclosure, a vehicle control method including receiving an engagement operation signal for stopping from an EPB apparatus and a current wheel speed value sensed by a sensing apparatus; determining whether the engagement operation signal is generated at a time immediately before a vehicle is stopped, and thus whether a current state is a first state on the basis of the current wheel speed value; when the current state is determined as the first state, receiving a current acceleration value sensed by the sensing apparatus; determining whether the current state is a second state in which the vehicle is intended to be stopped on land that is flat on the basis of the current acceleration value; when the current state is determined as the second state, determining that the current state is a third state in which it is impossible for the EPB apparatus to determine an inclination; when the current state is determined as the first state, the second state, and the third state, turning off an inclination determining mode of the EPB apparatus and turning on an inclination determination impossible mode of the EPB apparatus; and when the inclination determination impossible mode of the EPB apparatus is turned on, controlling the EPB apparatus to lower a current braking force value thereof to a target braking force value which is set to correspond to the inclination determination impossible mode.

The method may include, when determining whether the current state is the first state, determining whether the current wheel speed value is generated at a time at which the current wheel speed value reaches a target wheel speed value which is set correspond to a time immediately before the vehicle is stopped, and whether the engagement operation signal is generated at a time at which the engagement operation signal reaches the target wheel speed value.

The method may include, when the determining whether the current state is the second state, determining that the vehicle is intended to be stopped on the flat land when a magnitude of a sampled signal of the current acceleration value is smaller than a magnitude level of a sampled signal of the target acceleration value which is set to correspond to a time immediately before the vehicle is stopped.

The method may further include, when a braking force adjustment completion signal corresponding to the current lowered braking force value is received from the EPB apparatus, controlling the EPB apparatus to perform a braking force release operation thereof at a set target release time.

The method may further include applying a braking force releasing operation signal to the EPB apparatus in advance prior to the set target release time to allow the braking force release operation of the EPB apparatus to be performed at the set target release time.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
FIG. 1 is a block configuration diagram illustrating a state in which a vehicle control apparatus according to one embodiment of the present disclosure is connected to a sensing apparatus and an electronic parking brake (EPB) apparatus.

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein, and may be implemented in other forms. In the drawings, some portions not related to the description will be omitted and not shown to clearly describe the present disclosure, and sizes of components may be somewhat exaggerated to facilitate understanding.

Figure 2:
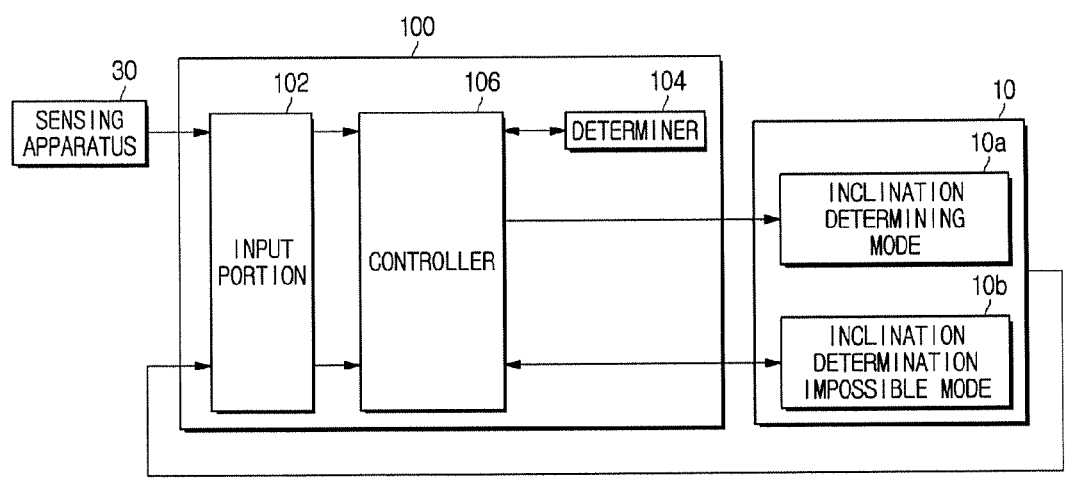
FIG. 2 is a block configuration diagram illustrating one example of the vehicle control apparatus shown in FIG. 1.

FIG. 1 is a block configuration diagram illustrating a state in which a vehicle control apparatus according to one embodiment of the present disclosure is connected to a sensing apparatus and an electronic parking brake (EPB) apparatus, and FIG. 2 is a block configuration diagram illustrating one example of the vehicle control apparatus shown in FIG. 1.

Figure 3:
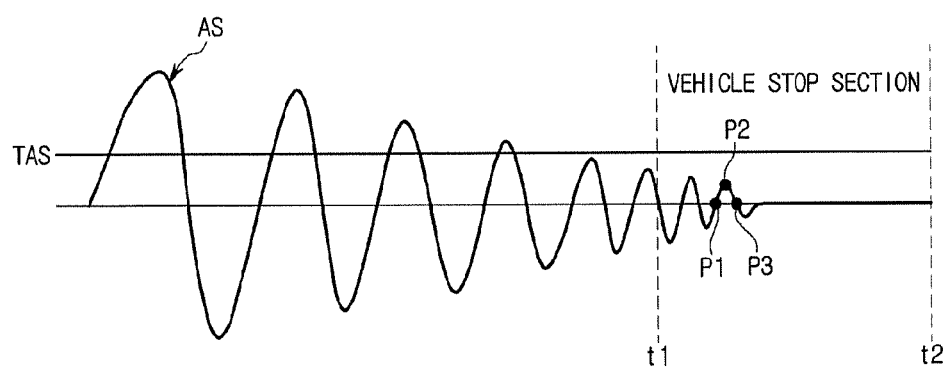
FIG. 3 is a waveform diagram illustrating a process in which a determiner shown in FIG. 2 determines whether an inclination determination is impossible in the EPB apparatus on the basis of a current wheel speed value and a current acceleration value.

FIG. 3 is a waveform diagram illustrating a process in which a determiner shown in FIG. 2 determines whether an inclination determination is impossible in the EPB apparatus on the basis of a current wheel speed value and a current acceleration value.

FIGS. 1 to 3, a vehicle control apparatus 100 according to one embodiment of the present disclosure includes an input portion 102, a determiner 104, and a controller 106.

The input portion 102 receives an engagement operation signal for stopping from an EPB apparatus 10, and receives a current wheel speed value and a current acceleration value which are sensed by a sensing apparatus 30.

At this point, although not shown in the drawing, the sensing apparatus 30 may include a wheel speed sensor (not shown) configured to sense the current wheel speed value and an acceleration sensor (not shown) configured to sense the current acceleration value.

The determiner 104 determines whether a current state in which the engagement operation signal input to the input portion 102 is generated immediately before a vehicle is stopped and whether a current state is a first state on the basis of the current wheel speed value input to the input portion 102 under the control of the controller 106.

As one example, as shown in FIGS. 2 and 3, when determining whether the current state is the first state, the determiner 104 may determine whether the current wheel speed value input to the input portion 102 reaches a target wheel speed value set at a time t1 corresponding to a time immediately before the vehicle is stopped during a vehicle stop time section t1 to t2, and whether the engagement operation signal input to the input portion 102 is generated at the time t1 at which the current wheel speed value reaches the target wheel speed value under the control of the controller 106.

At this point, the time t1 at which the current wheel speed value reaches the target wheel speed value may be a time at which the current wheel speed value becomes 0.5 kph or less.

Also, when the current state is determined to be the first state, the determiner 104 determines whether the first state is a second state in which the vehicle is intended to be stopped on land that is flat on the basis of the current acceleration value input to the input portion 102 under the control of the controller 106.

As one example, as shown in FIGS. 2 and 3, when determining whether the current state is the second state, the determiner 104 may determine that the vehicle is intended to be stopped on the flat land when a magnitude AS of a sampled signal of the current acceleration value input to the input portion 102 is smaller than a magnitude level TAS of a sampled signal of a target acceleration value which is set to correspond to a time immediately before the vehicle is stopped under the control of the controller 106.

At this point, when a magnitude between Point P1 and Point P2 and a magnitude between Point P2 and Point P3 of the magnitude AS of the sampled signal of the current acceleration value input to the input portion 102 are each smaller than the magnitude level TAS of the sampled signal of the target acceleration value, the determiner 104 may determine that the vehicle is intended to be stopped on the flat land under the control of the controller 106.

Also, when the current state is determined to be the second state, the determiner 104 determines that the EPB apparatus 10 is in a third state in which an inclination determination is impossible under the control of the controller 106.

When the determiner 104 determines that the current state is the first state, the second state, and the third state, the controller 106 turns off an inclination determining mode 10a of the EPB apparatus 10 and turns on an inclination determination impossible mode 10b of the EPB apparatus 10, thereby controlling the EPB apparatus 10 to lower a current braking force value of the EPB apparatus 10 to a target braking force value which is set to correspond to the inclination determination impossible mode 10b.

A vehicle control method for controlling a vehicle using the vehicle control apparatus 100 according to the embodiment of the present disclosure will be described with reference to FIG. 4.

Figure 4:
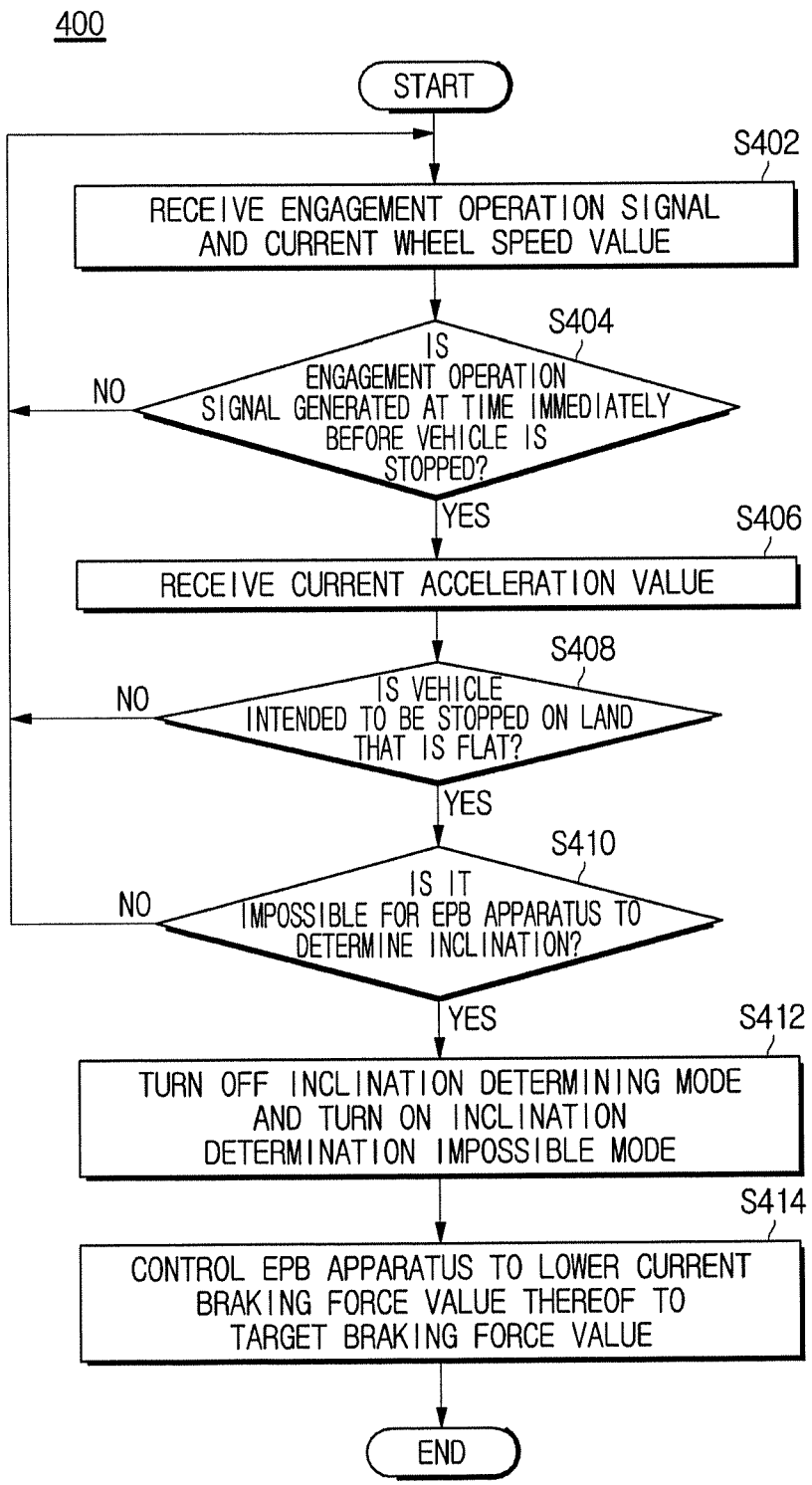
FIG. 4 is a flowchart illustrating one example of a vehicle control method of the vehicle control apparatus according to one embodiment of the present disclosure.

FIG. 4 is a flowchart illustrating one example of a vehicle control method of the vehicle control apparatus according to one embodiment of the present disclosure.

Referring to FIG. 4, a vehicle control method 400 of the vehicle control apparatus 100 in FIG. 2 according to one embodiment of the present disclosure includes a first input operation (402), a first determination operation (404), a second input operation (406), a second determination operation (408), a third determination operation (410), a mode change operation (412), and a braking force adjustment operation (414).

First, in the first input operation (402), the input portion 102 receives an engagement operation signal for stopping from the EPB device 10 in FIG. 2, and receives a current wheel speed value and a current acceleration value which are sensed by the sensing apparatus 30 in FIG. 2.

In the first determination operation (404), the determiner 104 in FIG. 2 determines whether the engagement operation signal input to the input portion 102 in FIG. 2 is generated at a time immediately before a vehicle is stopped and thus whether a current state is the first state on the basis of the current wheel speed value input to the input portion 102 in FIG. 2 under the control of the controller 106 in FIG. 2.

As one example, in the first determination operation (404), when determining whether the current state is the first state, the determiner 104 in FIG. 2 may determine whether the current wheel speed value input to the input portion 102 in FIG. 2 reaches a target wheel speed value which is set at the time t1 of FIG. 3 corresponding to a time immediately before the vehicle is stopped during a vehicle stop time section t1 to t2 of FIG. 3, and whether the engagement operation signal input to the input portion 102 in FIG. 2 is generated at the time t1 of FIG. 3 at which the current wheel speed value reaches the target wheel speed value under the control of the controller 106 in FIG. 2.

In the second input operation (406), when the determiner 104 in FIG. 2 determines that the current state is the first state, the input portion 102 in FIG. 2 receives the current acceleration value sensed by the sensing apparatus 30 in FIG. 2.

In the second determination operation (408), the determiner 104 in FIG. 2 determines whether the current state is the second state in which the vehicle is intended to be stopped on land that is flat on the basis of the current acceleration value input to the input portion 102 in FIG. 2 under the control of the controller 106 in FIG. 2.

As one example, in the second determination operation (408), when determining whether the current state is the second state, the determiner 104 in FIG. 2 may determine that the vehicle is intended to be stopped on the flat land when a magnitude AS of FIG. 3 of a sampled signal of the current acceleration value input to the input portion 102 in FIG. 2 is smaller than a magnitude level TAS of FIG. 3 of a sampled signal of a target acceleration value which is set to correspond to the time immediately before the vehicle is stopped under the control of the controller 106 in FIG. 2.

In the third determination operation (410), when the current state is determined to be the second state, the determiner 104 in FIG. 2 may determine that the EPB apparatus 10 in FIG. 2 is in the third state in which an inclination determination is impossible under the control of the controller 106 in FIG. 2.

In the mode change operation (412), when the determiner 104 in FIG. 2 determines that the current state is the first state, the second state, and the third state, the controller 106 in FIG. 2 turns off the inclination determining mode 10a in FIG. 2 of the EPB apparatus 10 in FIG. 2 and turns on the inclination determination impossible mode 10b in FIG. 2 of the EPB apparatus 10 in FIG. 2.

In the braking force adjustment operation (414), when the determiner 104 in FIG. 2 determines that the inclination determination impossible mode 10b in FIG. 2 of the EPB apparatus 10 in FIG. 2 is turned on, the controller 106 in FIG. 2 controls the EPB apparatus 10 in FIG. 2 to lower a current braking force value of the EPB apparatus 10 in FIG. 2 to the target braking force value which is set to correspond to the inclination determination impossible mode 10b in FIG. 2.

Figure 5:
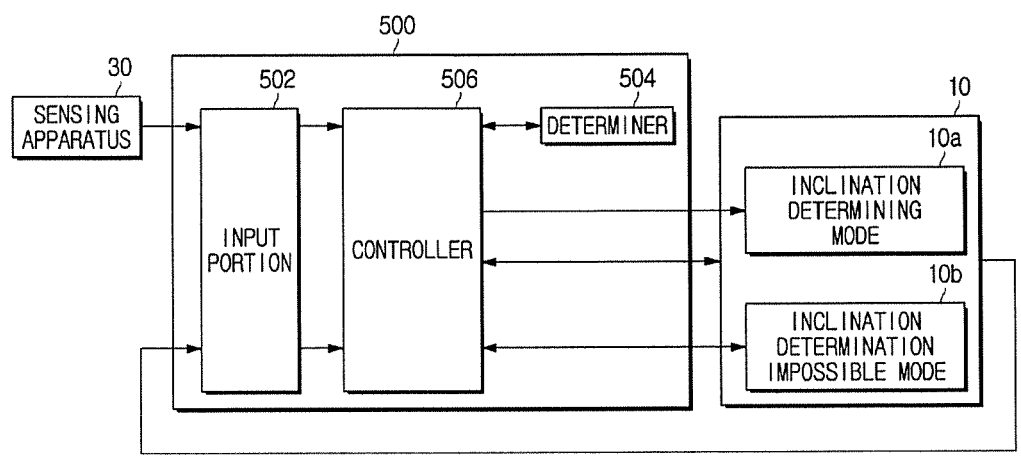
FIG. 5 is a block configuration diagram illustrating another example of the vehicle control apparatus according to one embodiment of the present disclosure.
Figure 6:
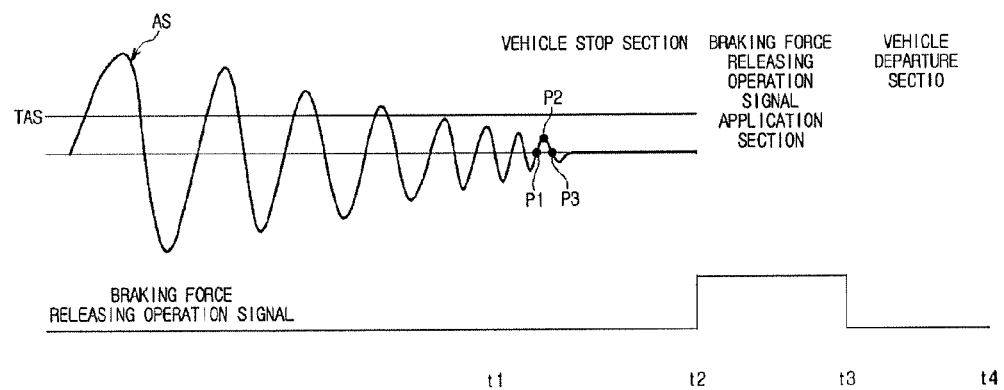
FIG. 6 is a waveform diagram illustrating a process in which a controller shown in FIG. 5 applies a braking force releasing operation signal to the EPB apparatus in advance.

FIG. 5 is a block configuration diagram illustrating another example of the vehicle control apparatus according to one embodiment of the present disclosure, and FIG. 6 is a waveform diagram illustrating a process in which the controller shown in FIG. 5 applies a braking force releasing operation signal to the EPB apparatus in advance.

Referring to FIGS. 5 and 6, like the vehicle control apparatus 100 in FIG. 2, a vehicle control apparatus 500 according to one embodiment of the present disclosure includes an input portion 502, a determiner 504, and a controller 506.

Functions of components of the vehicle control apparatus 500 according to one embodiment of the present disclosure and an organic connection relationship between the components are the same as those of the components of the vehicle control apparatus 100 in FIG. 2, and as such additional descriptions thereof will be omitted below.

When the controller 506 of the vehicle control apparatus 500 according to one embodiment of the present disclosure receives a braking force adjustment completion signal corresponding to a current lowered braking force value from the EPB apparatus 10, the controller 506 further controls the EPB apparatus 10 to perform a braking force release operation thereof at a target release time.

At this point, as shown in FIGS. 5 and 6, during a braking force releasing operation signal application time section t2 to t3 before a vehicle departure time section t3 to t4, the controller 506 may apply a braking force releasing operation signal to the EPB apparatus at the time t2 to allow a braking force release operation of the EPB apparatus 10 to be performed at the time t3.

A vehicle control method for controlling a vehicle using the vehicle control apparatus 500 according to one embodiment of the present disclosure will be described with reference to FIG. 7.

Figure 7:
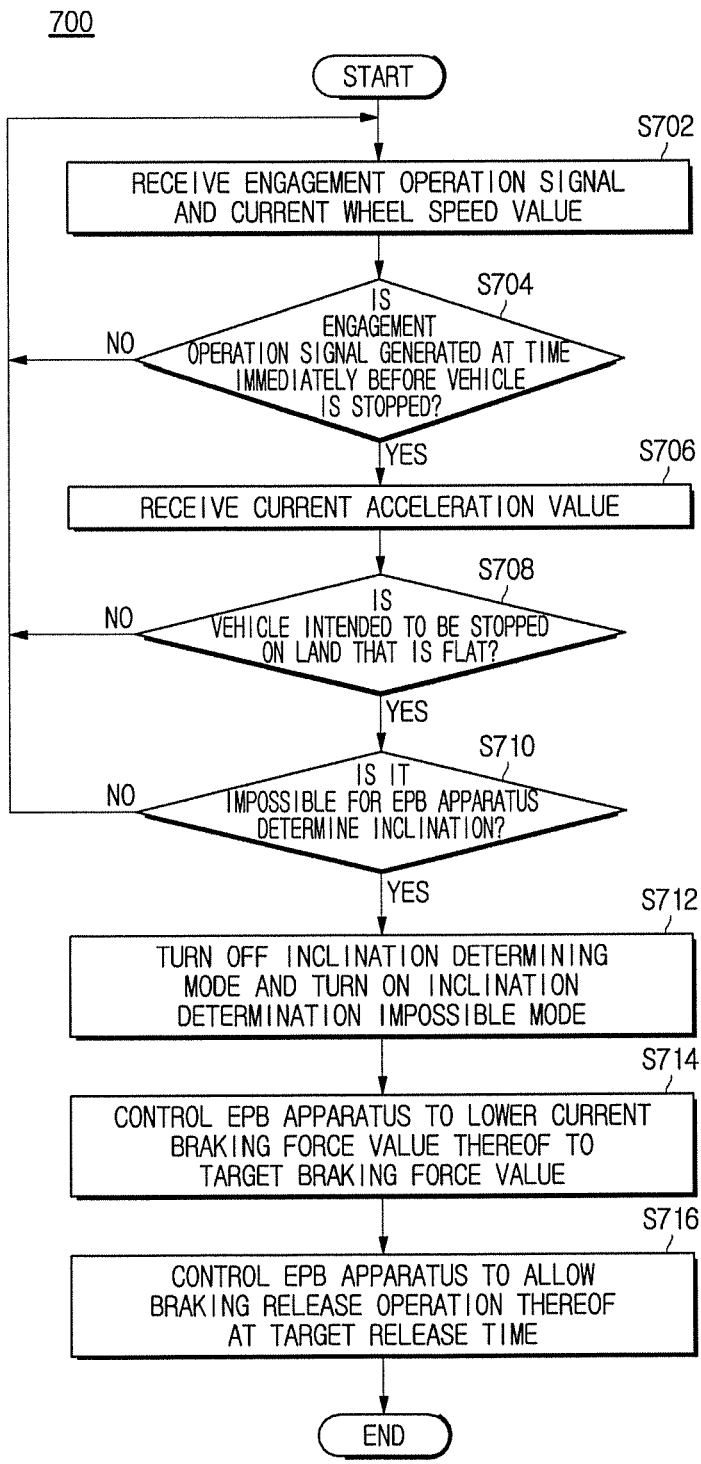
FIG. 7 is a flowchart illustrating another example of the vehicle control method of the vehicle control apparatus according to one embodiment of the present disclosure.

FIG. 7 is a flowchart illustrating another example of the vehicle control method of the vehicle control apparatus according to one embodiment of the present disclosure.

Referring to FIG. 7, like the vehicle control method 400 in FIG. 4 of the vehicle control apparatus 100 in FIG. 2, a vehicle control method 700 of the vehicle control apparatus 500 in FIG. 5 according to one embodiment of the present disclosure includes a first input operation (702), a first determination operation (704), a second input operation (706), a second determination operation (708), a third determination operation (710), a mode change operation (712), and a braking force adjustment operation (714).

Functions of the operations of the vehicle control method 700 of the vehicle control apparatus 500 in FIG. 5 according to one embodiment of the present disclosure and an organic connection relationship between the operations thereof are the same as those of the operations of the vehicle control method 400 in FIG. 4 of the vehicle control apparatus 100 in FIG. 2, and as such additional descriptions thereof will be omitted below.

Here, the vehicle control method 700 of the vehicle control apparatus 500 in FIG. 5 according to one embodiment of the present disclosure may further include a braking force release operation (716).

As one example, the braking force release operation (716) may be performed after the braking force adjustment operation (714).

In the braking force release operation (716), when the controller 506 in FIG. 5 receives a braking force adjustment completion signal corresponding to the current lowered braking force value from the EPB apparatus 10 in FIG. 5, the controller 506 in FIG. 5 further controls the EPB apparatus 10 in FIG. 5 to perform a braking force release operation thereof at a target release time which is set in the controller 506 in FIG. 5.

At this point, in the braking force release operation (716), during the braking force releasing operation signal application time section t2 to t3 in FIG. 6 before the vehicle departure time section t3 to t4 in FIG. 6, the controller 506 in FIG. 5 may apply a braking force releasing operation signal to the EPB apparatus 10 in FIG. 5 at the time t2 in FIG. 6 to allow a braking force release operation of the EPB apparatus 10 in FIG. 5 to be performed at the time t3 in FIG. 6.

Meanwhile, the vehicle control apparatuses 100 and 500 according to embodiments of the present disclosure have been described by separating the configurations of the input portions 102 and 502, the determiners 104 and 504, and the controllers 106 and 506 to clearly describe the features of the present disclosure, but, although not shown in the drawing, the input portions 102 and 502, the determiners 104 and 504, and the controllers 106 and 506 may be a conventional electronic control unit (ECU) (not shown) or a conventional micro control unit (MCU) (not shown) configured to control an overall operation and receive the engagement operation signal for a determination and stoppage, the current wheel speed value, and the current acceleration value.

Also, the input portions 102 and 502, the determiners 104 and 504, and the controllers 106 and 506 are not limited to the above-described configurations, and they may include all control means, determination means, and input means which are capable of controlling the overall operation of the vehicle and receiving the engagement operation signal for a determination and stoppage, the current wheel speed value, and the current acceleration value.

Here, the input portions 102 and 502, the determiners 104 and 504, and the controllers 106 and 506 may be integrally or separately provided with an ECU (not shown) or an MCU (not shown).

Figure 8:
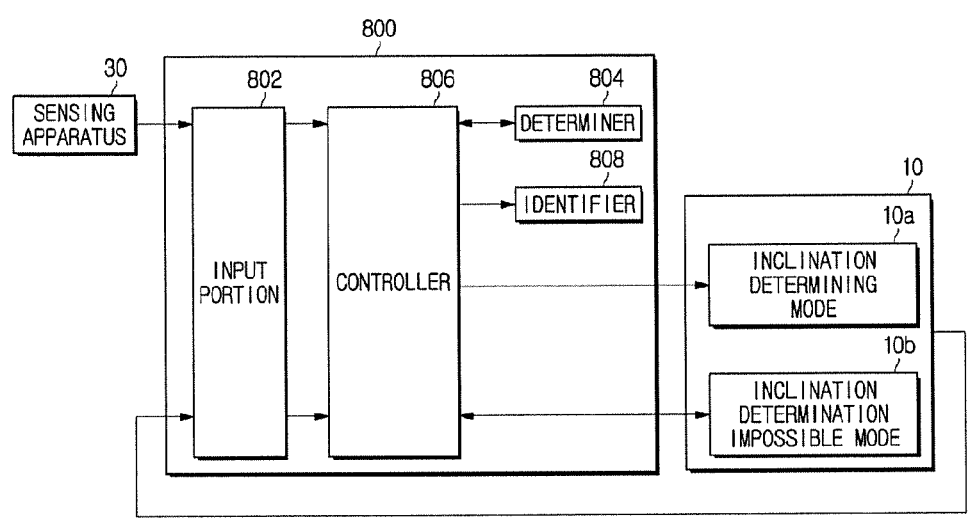
FIG. 8 is a block configuration diagram illustrating still another example of the vehicle control apparatus according to one embodiment of the present disclosure.

FIG. 8 is a block configuration diagram illustrating yet another example of the vehicle control apparatus according to one embodiment of the present disclosure.

Referring to FIG. 8, like the vehicle control apparatus 100 in FIG. 2, a vehicle control apparatus 800 according to one embodiment of the present disclosure includes an input portion 802, a determiner 804, and a controller 806.

Functions of components of the vehicle control apparatus 800 according to one embodiment of the present disclosure and an organic connection relationship between the components thereof are the same as those of the components of the vehicle control apparatus 100 in FIG. 2, and as such an additional description thereof will be omitted below.

Here, the vehicle control apparatus 800 according to one embodiment of the present disclosure may further include an identifier 808.

That is, when the determiner 804 determines that a current state is the first state, the identifier 808 may identify that a current engagement operation is performed before a vehicle is stopped under the control of the controller 806.

That is, when the determiner 804 determines that the current state is the third state, the identifier 808 may identify that the EPB apparatus 10 is currently in a situation in which an inclination determination is impossible under the control of the controller 806.

Also, when the controller 806 controls the EPB apparatus 10 to lower a current braking force value of the EPB apparatus 10 to a target braking force value, the identifier 808 may identify a situation in which the current braking force is being lowered under the control of the controller 806.

In addition, when the controller 806 receives a braking force adjustment completion signal corresponding to the current lowered braking force value from the EPB apparatus 10, the identifier 808 may identify a situation in which that the braking force is lowered under the control of the controller 806.

At this point, although not shown in the drawing, the identifier 808 may include at least one of an alarm (not shown), a speaker (not shown), and a light emitting member (not shown), which are provided to allow a driver to identify information or a state of the vehicle and allow the driver to identify that a current engagement operation is performed before the vehicle is stopped, a situation in which it is impossible for the EPB apparatus 10 to determine an inclination, the situation in which the braking force is being lowered, and the situation in which the braking force is lowered through at least one of an alarm operation of the alarm (not shown), a sound operation of the speaker (not shown), and a light emitting operation of the light emitting member (not shown).

In addition, although not shown in the drawing, the identifier 808 may include at least one of a human machine interface (HMI) module (not shown) and a head-up display (HUD) module (not shown), which interface between the driver and the vehicle to allow the driver to determine the information or state of the vehicle and allow the driver to identify that the current engagement operation is performed before the vehicle is stopped, the situation in which it is impossible for the EPB apparatus 10 to determine an inclination, the situation in which the braking force is being lowered, and the situation in which the braking force is lowered through at least one of an HMI message displaying operation of the HMI module (not shown) and an HUD message displaying operation of the HUD module (not shown).

A vehicle control method for controlling a vehicle using the vehicle control apparatus 800 according to one embodiment of the present disclosure will be described with reference to FIGS. 9 to 12.

Figure 9:
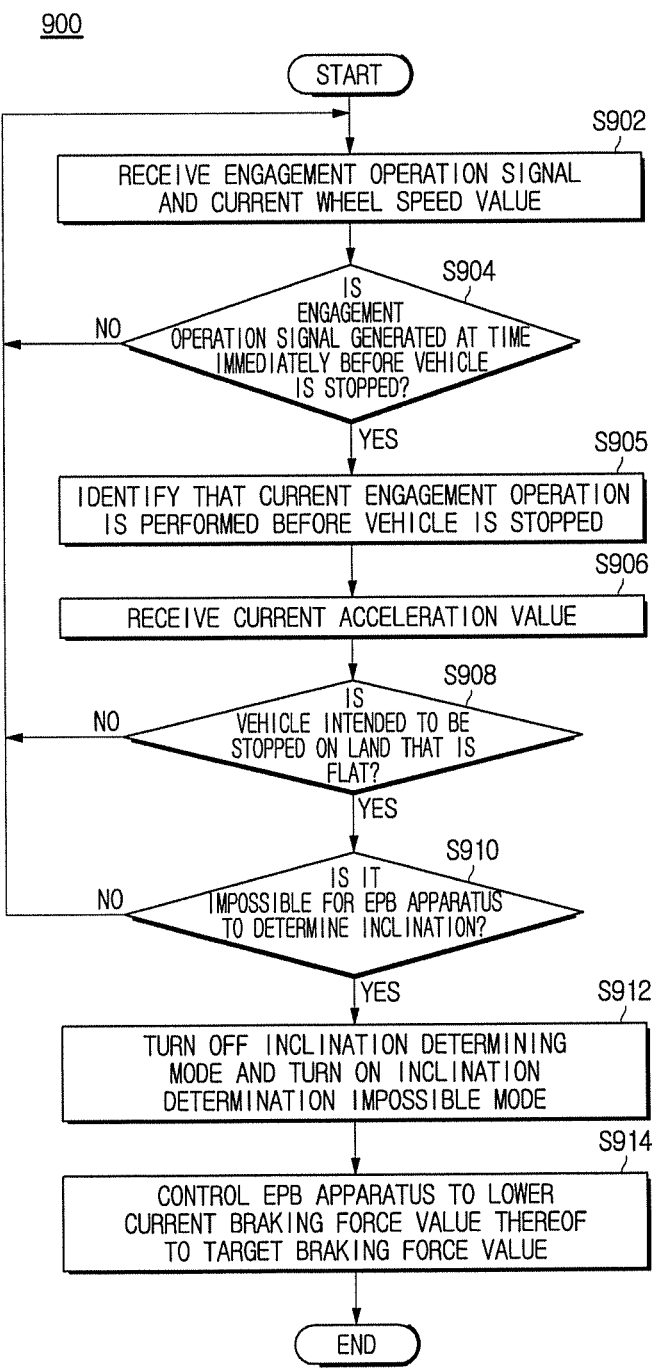
FIG. 9 is a flowchart illustrating still another example of the vehicle control method of the vehicle control apparatus according to one embodiment of the present disclosure.
Figure 10:
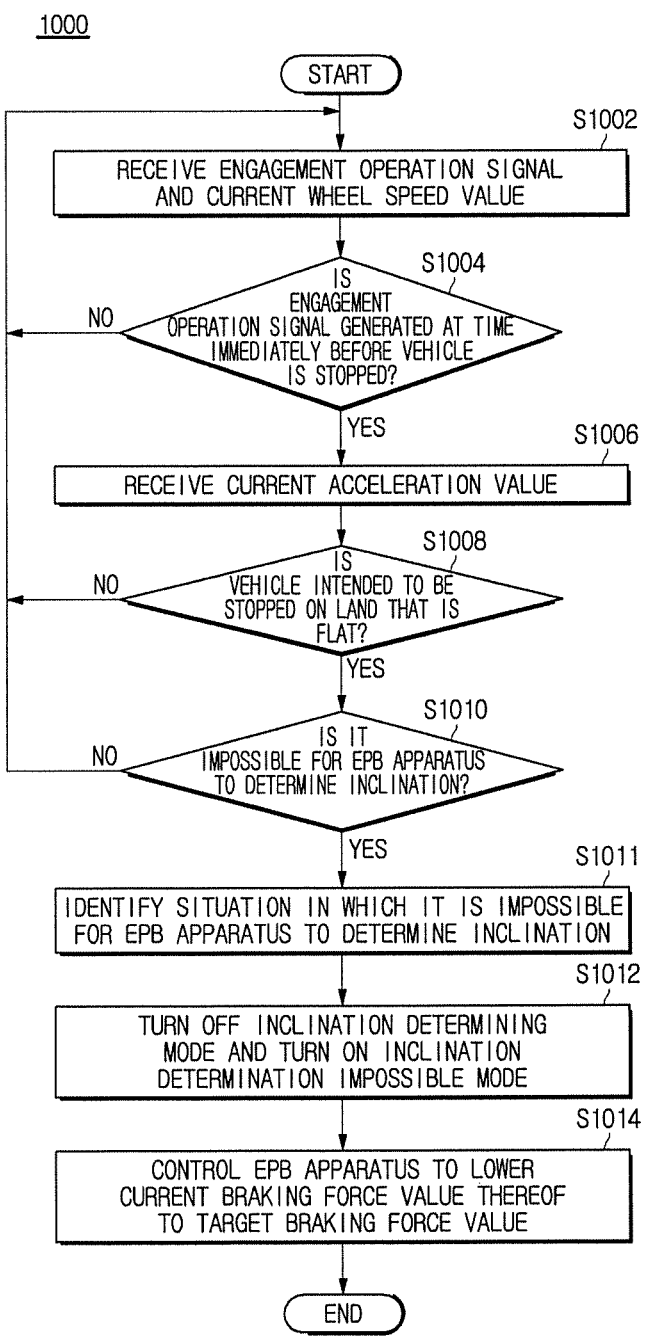
FIG. 10 is a flowchart illustrating yet another example of the vehicle control method of the vehicle control apparatus according to one embodiment of the present disclosure.

FIG. 9 is a flowchart illustrating still another example of the vehicle control method of the vehicle control apparatus according to one embodiment of the present disclosure, and FIG. 10 is a flowchart illustrating yet another example of the vehicle control method of the vehicle control apparatus according to one embodiment of the present disclosure.

Figure 11:
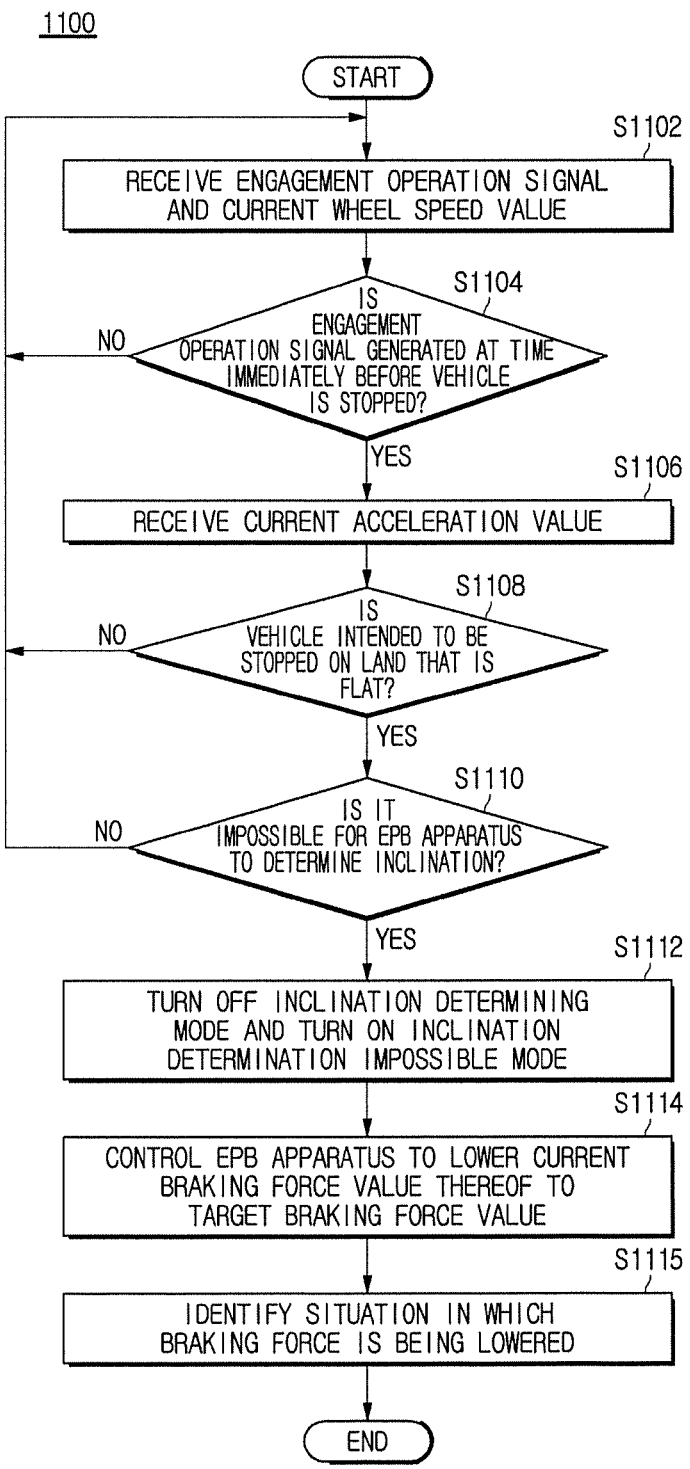
FIG. 11 is a flowchart illustrating yet another example of the vehicle control method of the vehicle control apparatus according to one embodiment of the present disclosure.
Figure 12:
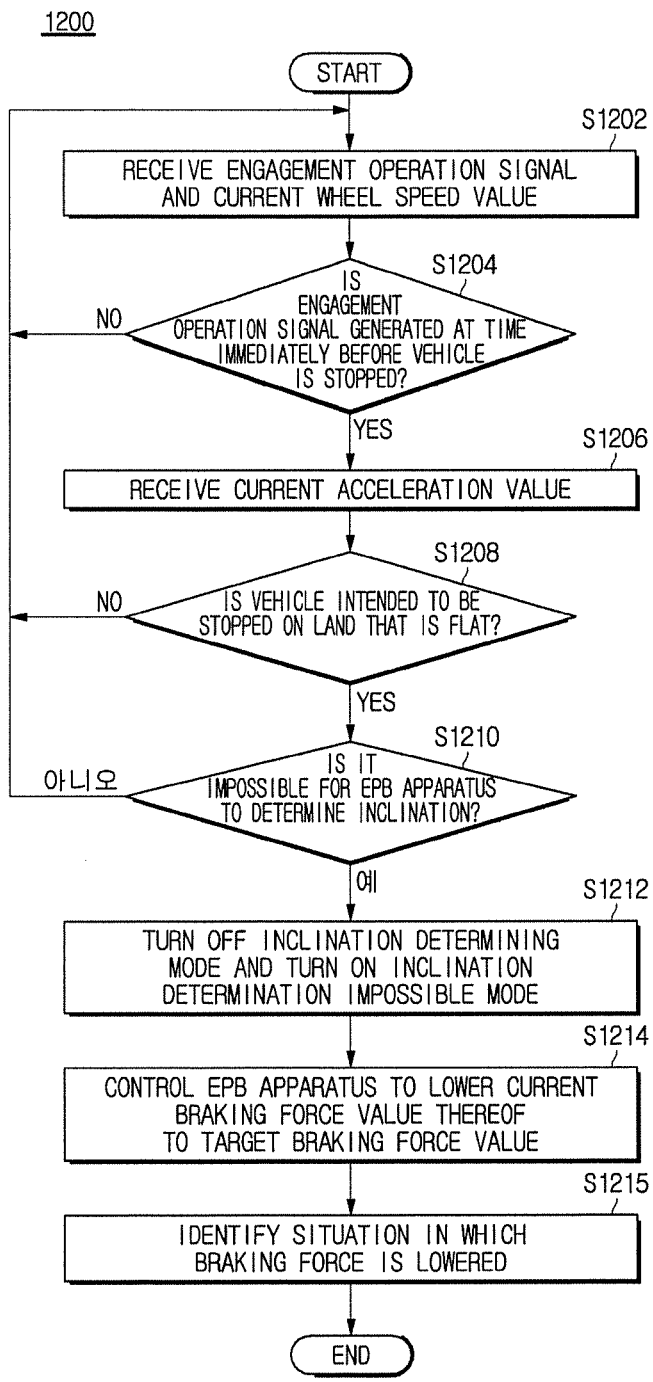
FIG. 12 is a flowchart illustrating yet another example of the vehicle control method of the vehicle control apparatus according to one embodiment of the present disclosure.

FIG. 11 is a flowchart illustrating yet another example of the vehicle control method of the vehicle control apparatus according to one embodiment of the present disclosure, and FIG. 12 is a flowchart illustrating yet another example of the vehicle control method of the vehicle control apparatus according to one embodiment of the present disclosure.

Referring to FIGS. 9 to 12, like the vehicle control method 400 in FIG. 4 of the vehicle control apparatus 100 in FIG. 2, vehicle control methods 900, 1000, 1100, and 1200 of the vehicle control apparatus 800 in FIG. 8 according to embodiments of the present disclosure include first input operations (902, 1002, 1102, and 1202), first determination operations (904, 1004, 1104, and 1204), second input operations (906, 1006, 1106, and 1206), second determination operations (908, 1008, 1108, and 1208), third determination operations (910, 1010, 1110, and 1210), mode change operations (912, 1012, 1112, and 1212), and braking force adjustment operations (914, 1014, 1114, and 1214), respectively.

Functions of the operations of the vehicle control methods 900, 1000, 1100, and 1200 of the vehicle control apparatus 800 in FIG. 8 according to embodiments of the present disclosure and an organic connection relationship between the operations thereof are the same as those of the operations of the vehicle control method 400 in FIG. 4 of the vehicle control apparatus 100 in FIG. 2, and as such additional descriptions thereof will be omitted below.

Here, the vehicle control methods 900, 1000, 1100, and 1200 of the vehicle control apparatus 800 of FIG. 8 according to embodiments of the present disclosure may include the first identification operation (905), the second identification operation (1011), the third identification operation (1115), and the fourth identification operation (1215), respectively.

The first identification operation (905) may be performed after the first determination operation (904) and before the second input operation (906).

As another example, although not shown in the drawing, the first identification operation (905) may be performed in synchronization with the second input operation (906).

In the first identification operation (905), when the determiner 804 in FIG. 8 determines that a current state is the first state, the identifier 808 in FIG. 8 may identify that a current engagement operation is performed before the vehicle is stopped under the control of the controller 806 in FIG. 8.

The second identification operation (1011) may be performed after the third determination operation (1010) and before the mode change operation (1012).

As still another example, although not shown in the drawing, the second identification operation (1011) may be performed in synchronization with the mode change operation (1012).

In the second identification operation (1011), when the determiner 804 in FIG. 8 determines that the current state is the third state, the identifier 808 in FIG. 8 may identify that the EPB apparatus 10 in FIG. 8 is currently in a situation in which an inclination determination is impossible under the control of the controller 806 in FIG. 8.

The third identification operation (1115) may be performed after the braking force adjustment operation (1114).

As yet another example, although not shown in the drawing, the third identification operation (1115) may be performed in synchronization with the braking force adjustment operation (1114).

In the third identification operation (1115), when the controller 806 in FIG. 8 controls the EPB apparatus 10 in FIG. 8 to lower a current braking force value to a target braking force value, the identifier 808 in FIG. 8 may identify a situation in which a braking force is being lowered under the control of the controller 806 in FIG. 8.

The fourth identification operation (1215) may be performed after the braking force adjustment operation (1214).

In the fourth identification operation (1215), when the controller 806 in FIG. 8 receives a braking force adjustment completion signal corresponding to the current lowered braking force value from the EPB 10 in FIG. 8, the identifier 808 in FIG. 8 may identify a situation in which the braking force is lowered under the control of the controller 806 in FIG. 8.

Figure 13:
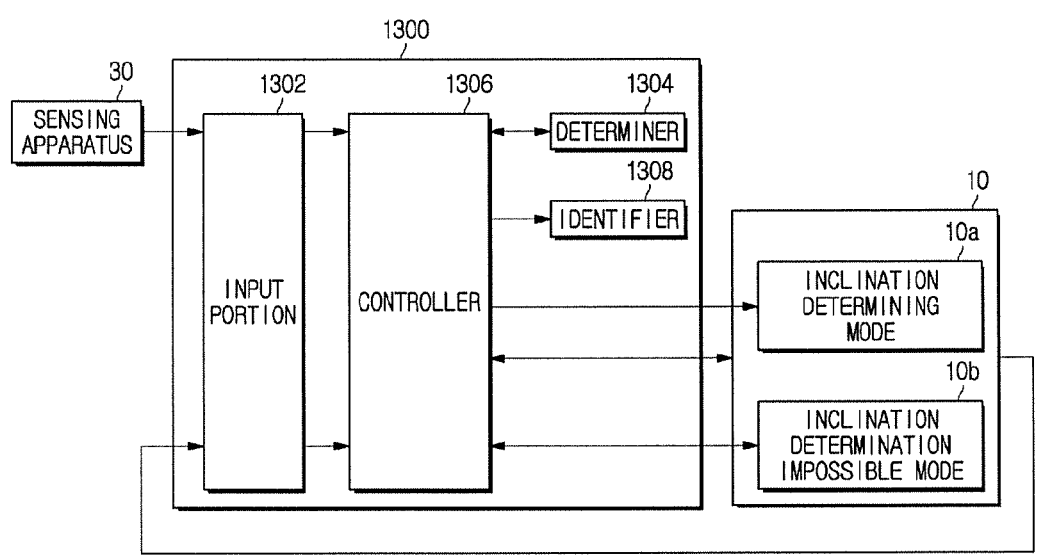
FIG. 13 is a block configuration diagram illustrating yet another example of the vehicle control apparatus according to one embodiment of the present disclosure.

FIG. 13 is a block configuration diagram illustrating yet another example of the vehicle control apparatus according to one embodiment of the present disclosure.

Referring to FIG. 13, like the vehicle control apparatus 500 in FIG. 5, a vehicle control apparatus 1300 according to one embodiment of the present disclosure includes an input portion 1302, a determiner 1304, and a controller 1306.

Functions of components of the vehicle control apparatus 1300 according to one embodiment of the present disclosure and an organic connection relationship between the components thereof are the same as those of the components of the vehicle control apparatus 500 in FIG. 5, and as such additional descriptions thereof will be omitted below.

Here, the vehicle control apparatus 1300 according to one embodiment of the present disclosure may further include an identifier 1308.

That is, when a braking force release operation of the EPB apparatus 10 is performed by the controller 1306 at a target release time t3, the identifier 1308 may identify a situation in which the braking force is being released under the control of the controller 1306.

At this point, although not shown in the drawing, the identifier 1308 may include at least one of an alarm (not shown), a speaker (not shown), and a light emitting member (not shown), which are provided to allow a driver to identify information or a state of the vehicle and allow the driver to identify the situation in which the braking force is being released through at least one of an alarm operation of the alarm (not shown), a sound operation of the speaker (not shown), and a light emitting operation of the light emitting member (not shown).

In addition, although not shown in the drawing, the identifier 1308 may include at least one of an HMI module (not shown) and an HUD module (not shown), which interface between the driver and the vehicle to allow the driver to determine the information or state of the vehicle and allow the driver to identify the situation in which the braking force is being released through at least one of an HMI message displaying operation of the HMI module (not shown) and an HUD message displaying operation of the HUD module (not shown).

A vehicle control method for controlling a vehicle using the vehicle control apparatus 1300 according to one embodiment of the present disclosure will be described with reference to FIG. 14.

Figure 14:
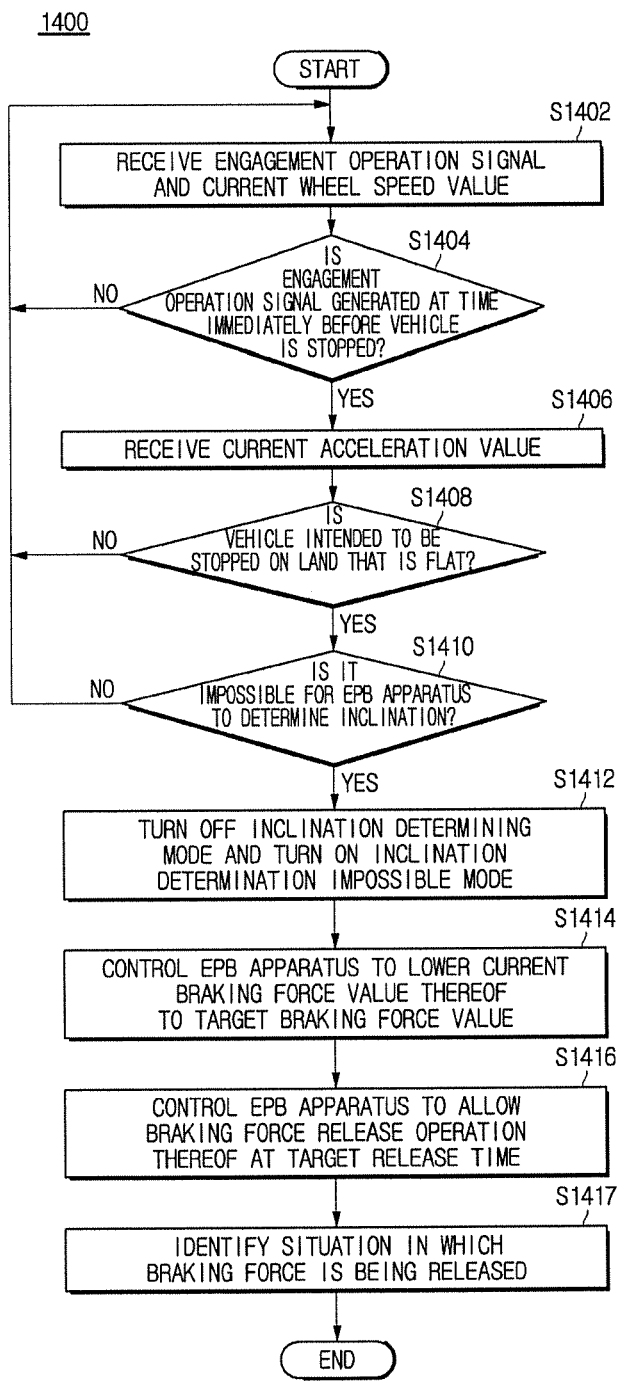
FIG. 14 is a flowchart illustrating yet another example of the vehicle control method of the vehicle control apparatus according to one embodiment of the present disclosure.

FIG. 14 is a flowchart illustrating yet another example of the vehicle control method of the vehicle control apparatus according to one embodiment of the present disclosure.

Referring to FIG. 14, like the vehicle control method 700 in FIG. 7 of the vehicle control apparatus 500 in FIG. 5, a vehicle control method 1400 of the vehicle control apparatus 1300 in FIG. 13 according to one embodiment of the present disclosure includes a first input operation (1402), a first determination operation (1404), a second input operation (1406), a second determination operation (1408), a third determination operation (1410), a mode change operation (1412), a braking force adjustment operation (1414), and a braking force release operation (1416).

Functions of operations of the vehicle control method 1400 of the vehicle control apparatus 1300 in FIG. 13 according to one embodiment of the present disclosure and an organic connection relationship between the operations thereof are the same as those of the operations of the vehicle control method 700 in FIG. 7 of the vehicle control apparatus 500 in FIG. 5, and as such additional descriptions thereof will be omitted below.

Here, the vehicle control method 1400 of the vehicle control apparatus 1300 in FIG. 13 according to one embodiment of the present disclosure may further include a fifth identification operation (1417).

That is, the fifth identification operation (1417) may be performed after the braking force release operation (1416).

As another example, although not shown in the drawing, the fifth identification operation (1417) may be performed in synchronization with the braking force release operation (1416).

In the fifth identification operation (1417), when the braking force release operation of the EPB apparatus 10 is performed by the controller 1306 at the target release time t3, the identifier 1308 may identify the situation in which the braking force is being released under the control of the controller 1306.

As described above, the vehicle control apparatuses 100 and 800 and the vehicle control methods 400, 900, 1000, 1100, and 1200 thereof according to embodiments of the present disclosure include the input portions 102 and 802, the determiners 104 and 804, and the controllers 106 and 806, respectively, and perform the first input operations (402, 902, 1002, 1102, and 1202), the first determination operations (404, 904, 1004, 1104, and 1204), the second input operations (406, 906, 1006, 1106, and 1206), the second determination operations (408, 908, 1008, 1108, and 1208), the third determination operations (410, 910, 1010, 1110, and 1210), the mode change operations (412, 912, 1012, 1112, and 1212), and the braking force adjustment operations (414, 914, 1014, 1114, and 1214), respectively.

Therefore, the vehicle control apparatuses 100 and 800 and the vehicle control methods 400, 900, 1000, 1100, and 1200 thereof according to one embodiment of the present disclosure may determine whether an engagement operation signal for an EPB engagement is generated at a time immediately before a vehicle is stopped using a current wheel speed value, and whether a current state is a state in which the vehicle is intended to be stopped on land that is flat using a current acceleration value.

Accordingly, when the engagement operation signal for the EPB engagement is generated at the time immediately before the vehicle is stopped and the current state is the state in which the vehicle is intended to be stopped on the flat land, the vehicle control apparatuses 100 and 800 and the vehicle control methods 400, 900, 1000, 1100, and 1200 thereof according to embodiments of the present disclosure may turn on the inclination determination impossible mode 10b of the EPB apparatus 10 to control the EPB apparatus 10 to lower the current braking force value to a target braking force value which is set to correspond to the inclination determination impossible mode 10b.

Therefore, when the braking force of the EPB apparatus 10 is released, the vehicle control apparatuses 100 and 800 and the vehicle control methods 400, 900, 1000, 1100, and 1200 thereof according to embodiments of the present disclosure may shorten a time at which the braking force is released, thereby improving traveling efficiency when a stopping mode is switched to a traveling mode.

Also, the vehicle control apparatuses 500 and 1300 and the vehicle control methods 700 and 1400 thereof according to embodiments of the present disclosure may include the input portions 502 and 1302, the determiners 504 and 1304, and the controllers 506 and 1306, respectively, and perform the first input operations (702 and 1402), the first determination operations (704 and 1404), the second input operations (706 and 1406), the second determination operations (708 and 1408), the third determination operations (710 and 1410), the mode change operations (712 and 1412), the braking force adjustment operations (714 and 1414), and the braking force release operations (716 and 1416), respectively.

Accordingly, during the braking force releasing operation signal application section t2 to t3 before the vehicle departure section t3 to t4, the vehicle control apparatuses 500 and 1300 and the vehicle control methods 700 and 1400 thereof according to embodiments of the present disclosure may apply the braking force releasing operation signal to the EPB apparatus 10 at the time t2 prior to the target release time t3 to allow the braking force release operation of the EPB apparatus 10 to be performed at the target release time t3.

Consequently, when the braking force of the EPB apparatus 10 is released, the vehicle control apparatuses 500 and 1300 and the vehicle control methods 700 and 1400 thereof according to embodiments of the present disclosure may further shorten the time at which the braking force is released, thereby further improving the traveling efficiency when the stopping mode is switched to the traveling mode.

In addition, the vehicle control apparatuses 800 and 1300 and the vehicle control methods 900, 1000, 1100, 1200, and 1400 thereof according to embodiments of the present disclosure may include the identifiers 808 and 1308, respectively, and perform the first identification operation (905), the second identification operation (1011), the third identification operation (1115), the fourth identification operation (1215), and the fifth identification operation (1417), respectively.

Accordingly, the vehicle control apparatuses 800 and 1300 and the vehicle control methods 900, 1000, 1100, 1200, and 1400 thereof according to embodiments of the present disclosure may identify that a current engagement operation is performed before the vehicle is stopped, a situation in which it is impossible for the EPB apparatus 10 to determine an inclination, a situation in which the braking force is being lowered, a situation in which the braking force is lowered, and a situation in which the braking force is being released.

Consequently, the vehicle control apparatuses 800 and 1300 and the vehicle control methods 900, 1000, 1100, 1200, and 1400 thereof according to embodiments of the present disclosure may allow the driver to recognize a current EPB engagement operation state, a current inclination determination state of the EPB apparatus 10, and a current braking force state thereof, thereby inducing the driver to cautiously drive while suppressing the driver's anxiety about the current EPB engagement operation state, the current inclination determination state of the EPB apparatus 10, and the current braking force state thereof.

As should be apparent from the above description, the vehicle control apparatus and the control method thereof according to the embodiments of the present disclosure are capable of improving the traveling efficiency when the stopping mode is switched to the traveling mode.

Also, the vehicle control apparatus and the control method thereof according to the embodiments of the present disclosure can induce driver to cautiously drive while suppressing the driver's anxiety about the current EPB engagement operation state, the current inclination determination state of the EPB apparatus, and the current braking force state thereof.

What is claimed is:

1. A vehicle control apparatus comprising:
an input portion configured to receive an engagement operation signal for stopping from an electronic parking brake (EPB) apparatus and a current wheel speed value and a current acceleration value sensed by a sensing apparatus;
a determiner configured to determine whether the engagement operation signal is generated at a time immediately before a vehicle is stopped, and thus whether a current state is a first state on the basis of the current wheel speed value; when the current state is determined as the first state, determine whether the current state is a second state in which the vehicle is intended to be stopped on land that is flat on the basis of the current acceleration value; and, when the current state is determined as the second state, determine that the current state is in a third state in which it is impossible for the EPB apparatus to determine an inclination; and
a controller configured to turn off an inclination determining mode of the EPB apparatus and turn on an inclination determination impossible mode of the EPB apparatus when the current state is determined as the first state, the second state, and the third state, thereby controlling the EPB apparatus to lower a current braking force value of the EPB apparatus to a target braking force value which is set to correspond to the inclination determination impossible mode.

2. The apparatus of claim 1, wherein, when the determiner determines whether the current state is the first state, the determiner determines whether the current wheel speed value is generated at a time at which the current wheel speed value reaches a target wheel speed value which is set correspond to a time immediately before the vehicle is stopped, and whether the engagement operation signal is generated at a time at which the engagement operation signal reaches the target wheel speed value.

3. The apparatus of claim 1, wherein, when the determiner determines whether the current state is the second state, the determiner determines that the vehicle is intended to be stopped on the flat land when a magnitude of a sampled signal of the current acceleration value is smaller than a magnitude level of a sampled signal of the target acceleration value which is set to correspond to a time immediately before the vehicle is stopped.

4. The apparatus of claim 1, wherein, when the controller receives a braking force adjustment completion signal corresponding to the current lowered braking force value from the EPB apparatus, the controller further controls the EPB apparatus to perform a braking force release operation thereof at a set target release time.

5. The apparatus of claim 4, wherein the controller applies a braking force releasing operation signal to the EPB apparatus in advance prior to the set target release time to allow the braking force release operation of the EPB apparatus to be performed at the set target release time.

6. A vehicle control method comprising:
receiving an engagement operation signal for stopping from an electronic parking brake (EPB) apparatus and a current wheel speed value sensed by a sensing apparatus;
determining whether the engagement operation signal is generated at a time immediately before a vehicle is stopped and thus whether a current state is a first state on the basis of the current wheel speed value;

when the current state is determined as the first state, receiving a current acceleration value sensed by the sensing apparatus;

determining whether the current state is a second state in which the vehicle is intended to be stopped on land that is flat on the basis of the current acceleration value;

when the current state is determined as the second state, determining that the current state is a third state in which it is impossible for the EPB apparatus to determine an inclination;

when the current state is determined as the first state, the second state, and the third state, turning off an inclination determining mode of the EPB apparatus and turning on an inclination determination impossible mode of the EPB apparatus; and when the inclination determination impossible mode of the EPB apparatus is turned on, controlling the EPB apparatus to lower a current braking force value thereof to a target braking force value which is set to correspond to the inclination determination impossible mode.

7. The method of claim 6, wherein, in the determining, whether the current state is the first state, determining whether the current wheel speed value is generated at a time at which the current wheel speed value reaches a target wheel speed value which is set correspond to a time immediately before the vehicle is stopped, and whether the engagement operation signal is generated at a time at which the engagement operation signal reaches the target wheel speed value.

8. The method of claim 6, wherein, in the determining, whether the current state is the second state, determining that the vehicle is intended to be stopped on the flat land when a magnitude of a sampled signal of the current acceleration value is smaller than a magnitude level of a sampled signal of the target acceleration value which is set to correspond to a time immediately before the vehicle is stopped.

9. The method of claim 6, further comprising, when a braking force adjustment completion signal corresponding to the current lowered braking force value is received from the EPB, controlling the EPB apparatus to perform a braking force release operation thereof at a set target release time.

10. The method of claim 9, further comprising applying a braking force releasing operation signal to the EPB apparatus in advance prior to the set target release time to allow the braking force release operation of the EPB apparatus to be performed at the set target release time.

\* \* \* \* \*